(12) United States Patent
Burwell et al.

(10) Patent No.: US 7,510,339 B2
(45) Date of Patent: Mar. 31, 2009

(54) SYSTEM FOR SPLICING FIBER DROP CABLES

(75) Inventors: Doug Burwell, Georgetown (CA); Ibrahim Basrawi, Concord (CA); Glen Brehaut, Toronto (CA)

(73) Assignee: ShawCor Ltd., Toronto (CA)

( * ) Notice: Subject to any disclaimer, the term of this patent is extended or adjusted under 35 U.S.C. 154(b) by 0 days.

(21) Appl. No.: 12/179,145

(22) Filed: Jul. 24, 2008

(65) Prior Publication Data

US 2009/0034917 A1 Feb. 5, 2009

Related U.S. Application Data

(60) Provisional application No. 60/953,580, filed on Aug. 2, 2007.

(51) Int. Cl.
*G02B 6/255* (2006.01)
*G02B 6/00* (2006.01)

(52) U.S. Cl. .............................. 385/95; 385/99; 385/137
(58) Field of Classification Search .................... None
See application file for complete search history.

(56) References Cited

U.S. PATENT DOCUMENTS

| | | | |
|---|---|---|---|
| 4,846,545 A | 7/1989 | Estabrook et al. | |
| 5,121,458 A | 6/1992 | Nilsson et al. | |
| 5,210,812 A | 5/1993 | Nilsson et al. | |
| 5,257,337 A | 10/1993 | Grigsby et al. | |
| 5,315,682 A | 5/1994 | Daguet et al. | |
| 6,099,170 A | 8/2000 | Sarbell | |
| 6,282,353 B1 | 8/2001 | Clark | |
| 6,367,990 B1 | 4/2002 | Dumitriu | |
| 6,377,735 B1 | 4/2002 | Bernstein et al. | |
| 6,431,767 B2 | 8/2002 | Nagasaki | |
| 6,454,471 B1 | 9/2002 | Ware et al. | |
| 6,454,598 B1 | 9/2002 | Burwell et al. | |
| 6,518,551 B2 | 2/2003 | Watanabe et al. | |
| 6,623,181 B1 | 9/2003 | Daems | |
| 6,742,705 B1 | 6/2004 | Clark | |
| 7,001,084 B2 | 2/2006 | Carpenter et al. | |
| 7,040,818 B2 | 5/2006 | Sato | |

(Continued)

OTHER PUBLICATIONS

Tyco Electronics Corporation, Fiber Drop Repair Kit Installation Instruction, 2006, 10 pages, F528.03/06.

(Continued)

*Primary Examiner*—Omar Rojas
(74) *Attorney, Agent, or Firm*—DeLio & Peterson, LLC; Peter W. Peterson

(57) ABSTRACT

An splice enclosure for supporting a splice between the ends of a pair of fiber optic drop cables includes at least one longitudinally-extending flexible support member extending across the splice, a cover member which covers the splice and which overlaps the jackets of the two cables, and at least one collar. Each collar has a central aperture through which the buffer tube of a cable can be passed, at least one aperture for receiving a strength member of one of the cables, and at least one aperture for receiving an end of a support member. The support members preferably have similar or identical dimensions, composition and flexibility as the strength members of the cables so as to substantially preserve the flexibility of the cable across the splice. Also disclosed are kits for forming enclosures for optical fiber splices and methods for enclosing optical fiber splices.

20 Claims, 9 Drawing Sheets

U.S. PATENT DOCUMENTS

| | | |
|---|---|---|
| 7,072,559 B2 | 7/2006 | Giordano et al. |
| 7,118,035 B2 | 10/2006 | Clark |
| 7,128,478 B2 | 10/2006 | Takahashi et al. |
| 7,171,101 B2 | 1/2007 | Gould et al. |
| 7,310,470 B2 | 12/2007 | Ray et al. |
| 2002/0003934 A1 | 1/2002 | Clark |
| 2005/0244112 A1 | 11/2005 | Bugaud et al. |
| 2006/0233509 A1 | 10/2006 | Ray et al. |
| 2007/0127875 A1 | 6/2007 | Allen et al. |
| 2007/0160332 A1 | 7/2007 | Qian et al. |

OTHER PUBLICATIONS

Tyco Electronics Corporation, Fiber Drop Repair Splice Closure, Sep. 2006, 2 pages, F542.

Draka, ezDrop (TM) Flat Dielectric & Toneable Flat Drop Cable, Jul. 10, 2006, 2 pages, DS0002-03.

SYSTEM FOR SPLICING FIBER DROP CABLES

FIELD OF THE INVENTION

The present invention relates to the splicing of fiber optic cables, and more particularly to enclosures for optical fiber splices, kits for forming enclosures for optical fiber splices, and methods for enclosing optical fiber splices.

BACKGROUND OF THE INVENTION

Fiber optic cables are widely used for telecommunications applications. It is often necessary or desirable to splice two segments of fiber optic cable to one another. Splicing of fiber optic cables is typically a multi-step process. Firstly, the ends of the two cables are prepared to expose the optical fibers. Next, the ends of the optical fibers of the two cables are joined together, for example by fusing the fibers together, and then a protective heat shrink tube may be applied directly over the spliced fibers.

In order to avoid damage to the exposed, spliced fibers, a protective enclosure is applied to the spliced area. A number of enclosures are known in the prior art. Some prior art enclosures utilize a rigid or semi-rigid tray or bridge member which extends across and supports the splice. Examples of such systems are described in U.S. Publication No. 2006/0233509 A1 (Ray et al.) published on Oct. 19, 2006, and U.S. Publication No. 2007/0127875 A1 (Allen et al.) published on Jun. 7, 2007.

Other types of prior art enclosures simply utilize an inner tube which extends over the spliced optical fibers, a rigid support rod extending alongside the inner tube, and an outer tube which may be heat shrinkable and encloses both the rod and the inner tube. Structures of this type are described in U.S. Pat. No. 6,454,471 B1 (Ware et al.) issued on Sep. 24, 2002, U.S. Pat. No. 6,367,990 B1 (Dumitriu) issued on Apr. 9, 2002 and U.S. Pat. No. 6,099,170 (Sarbell) issued on Aug. 8, 2000.

Prior art enclosures for optical fiber splices are generally more rigid than the cables being spliced. The greater rigidity of the enclosure therefore impairs the normal flexibility of the optical fiber cable and may cause problems in some situations, as for example where the cable must be pulled through a curved conduit. In addition, many prior art systems require excessive amounts of time and skill to use, thereby making the splicing of optical fibers relatively expensive compared to other types of cable.

There is therefore a need for enclosures for optical fiber splices which do not impair the flexibility of the cable and which are simple and inexpensive to use.

SUMMARY OF THE INVENTION

In one aspect, provided is a splice enclosure supporting a splice between a first fiber optic drop cable and a second fiber optic drop cable, wherein each of the fiber optic cables comprises at least one optical fiber enclosed in a buffer tube, at least one flexible strength member extending alongside the buffer tube, and a jacket enclosing the at least one optical fiber, the buffer tube and the at least one strength member, wherein the at least one optical fiber of the first cable is spliced to the at least one optical fiber of the second drop cable, wherein the enclosure comprises: (a) at least one longitudinally-extending flexible support member extending across the splice, wherein the at least one support member has flexibility properties similar to those of the at least one strength member; (b) a cover member which covers the splice and which has a pair of opposed ends which overlap and are sealed to the jackets of the first and second cables, respectively; and (c) a first collar having a length defined along a longitudinal axis and having first and second opposed end faces, wherein the first collar comprises: (i) a longitudinally-extending central aperture which is sized and shaped to receive the buffer tube, wherein the first aperture is open at both ends and extends from the first end face to the second end face of the first collar; (ii) at least one longitudinally-extending strength member aperture which is open at the first end face of the first collar, each said strength member aperture being sized and shaped to closely receive an end of one of the strength members of the first cable; (iii) at least one longitudinally-extending support member aperture which is open at the second end face of the first collar, each said support member aperture being sized and shaped to closely receive an end of one of the support members, and wherein each of the strength member apertures is substantially coaxially aligned with one of the support member apertures of the first collar; and wherein the buffer tube of the first cable extends through the central aperture and extends out from the second end face of the first collar, the ends of the strength members of the first cable are secured against removal in the strength member apertures of the first collar, and the ends of the support members are secured against removal in the support member apertures of the first collar, such that the end of each of the strength members is substantially coaxially aligned with an end of one of the support members.

In an embodiment, the splice enclosure further comprises: (d) a second collar having a length defined along the longitudinal axis and having first and second opposed end faces, wherein the second collar comprises: (i) a longitudinally-extending central aperture which is sized and shaped to receive the buffer tube of the second cable, wherein the first aperture is open at both ends and extends from the first end face to the second end face of the second collar; and (ii) at least one longitudinally-extending strength member aperture which is open at the first end face of the second collar, each said strength member aperture being sized and shaped to closely receive an end of one of the strength members of the second cable; wherein the buffer tube of the second cable extends through the central aperture and extends out from the second end face of the second collar, the ends of the strength members of the second cable are secured against removal in the strength member apertures of the second collar, and the support members are secured to the second collar and extend from the second end face of the second collar toward the first collar, and wherein the end of each of the strength members is substantially coaxially aligned with an end of one of the support members.

In an embodiment, the second collar and the support members are components of an integrally formed collar assembly.

In an embodiment, the first and second collars are identical, and the second collar further comprises: (iii) at least one longitudinally-extending support member aperture which is open at the second end face of the second collar, each said support member aperture being sized and shaped to closely receive an end of one of the support members, and wherein each of the strength member apertures is substantially coaxially aligned with one of the support member apertures of the second collar; and wherein the ends of the strength members of the second cable are secured against removal in the strength member apertures of the second collar.

In an embodiment, the strength member apertures and the support member apertures extend only partially through the first collar, wherein each of the strength member apertures has a closed end spaced inwardly from the first end face of the first collar and each of the support members has a closed end spaced inwardly from the second end face of the first collar, wherein each of the strength member apertures is precisely coaxially aligned with one of the support member apertures of the first collar, and wherein the closed end of each of the strength member apertures is spaced from the closed end of the support member aperture with which it is coaxially aligned.

In an embodiment, the support member apertures extend completely through the first collar, and each of the strength member apertures is parallel to, and spaced from, one of the support member apertures of the first collar.

In an embodiment, the strength member apertures extend completely through the first collar, and each of the strength member apertures is parallel to, and spaced from, one of the support member apertures of the first collar.

In an embodiment, the strength member apertures are located in a first plane and the support member apertures are located in a second plane, and the first and second planes are parallel.

In an embodiment, one of the planes passes through a center of the central aperture.

In an embodiment, the strength member apertures and the support member apertures are located in a common plane.

In an embodiment, the common plane passes through a center of the central aperture.

In an embodiment, the collar comprises two of said strength member apertures which are located along opposite sides of the central aperture, and the collar comprises two of said support member apertures.

In an embodiment, the support members comprise end portions of the strength members of the second cable.

In an embodiment, the first collar is substantially cylindrical, and has a circular or oval cross-section.

In an embodiment, the cover member comprises a heat-shrinkable tube.

In an embodiment, the splice enclosure further comprises a spacer or spacer tray having portions which receive the support members in order to maintain a spacing between the support members and the spliced optical fibers.

In another aspect, provided is a kit for forming a splice enclosure for supporting a splice between a first fiber optic drop cable and a second fiber optic drop cable, wherein each of the fiber optic cables comprises at least one optical fiber enclosed in a buffer tube, at least one flexible strength member extending alongside the buffer tube, and a jacket enclosing the at least one optical fiber, the buffer tube and the at least one strength member, wherein the at least one optical fiber of the first cable is spliced to the at least one optical fiber of the second drop cable, the kit comprising: (a) at least one longitudinally-extending flexible support member having a length sufficient to extend across the splice, wherein the at least one support member has flexibility properties similar to those of the at least one strength member; (b) a tubular cover member having a diameter sufficient to cover the splice and having a length sufficient to overlap and the ends of the jackets of the first and second cables, respectively, across the splice; and (c) a first collar having a length defined along a longitudinal axis and having first and second opposed end faces, wherein the first collar comprises: (i) a longitudinally-extending central aperture which is sized and shaped to receive the buffer tube, wherein the first aperture is open at both ends and extends from the first end face to the second end face of the first collar; (ii) at least one longitudinally-extending strength member aperture which is open at the first end face of the first collar, each said strength member aperture being sized and shaped to closely receive an end of one of the strength members of the first cable; and (iii) at least one longitudinally-extending support member aperture which is open at the second end face of the first collar, each said support member aperture being sized and shaped to closely receive an end of one of the support members, and wherein each of the strength member apertures is substantially coaxially aligned with one of the support member apertures of the first collar.

BRIEF DESCRIPTION OF THE DRAWINGS

The invention will now be described, by way of example only, with reference to the accompanying drawings, in which.

DETAILED DESCRIPTION OF PREFERRED EMBODIMENTS

Figure 1:
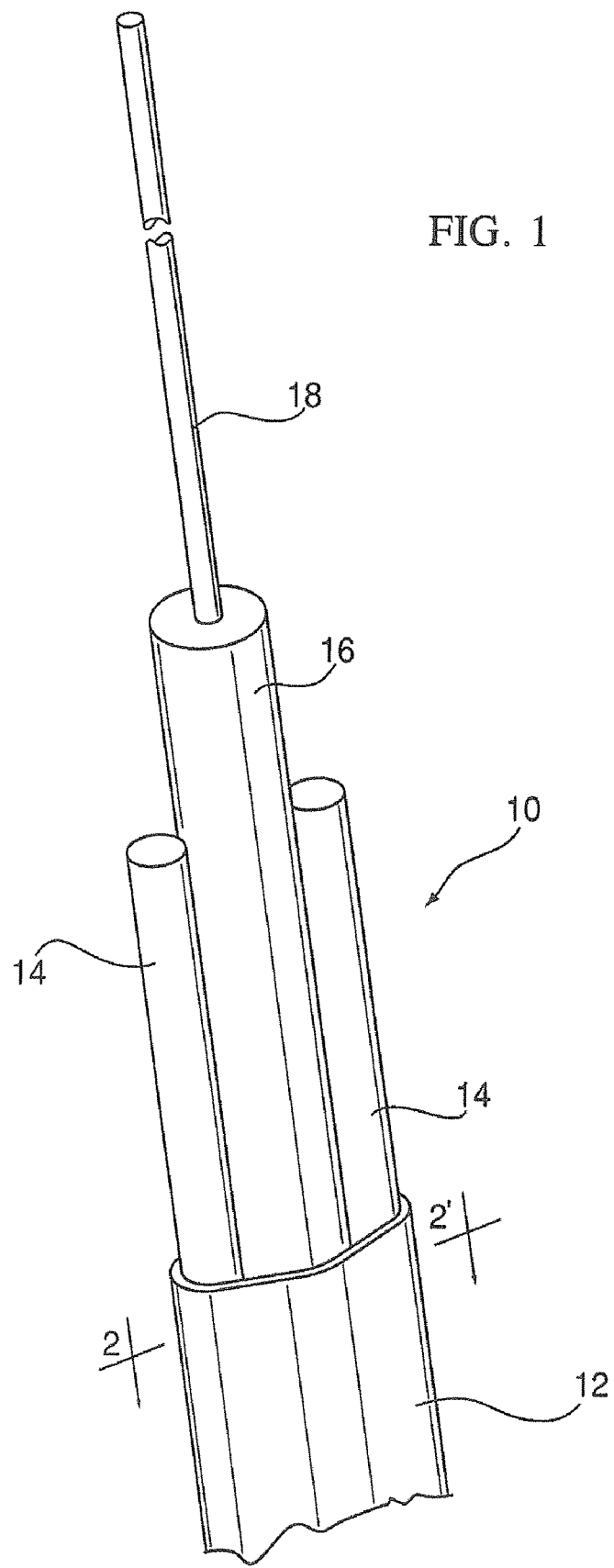
FIG. 1 illustrates a fiber optic drop cable.
Figure 2:
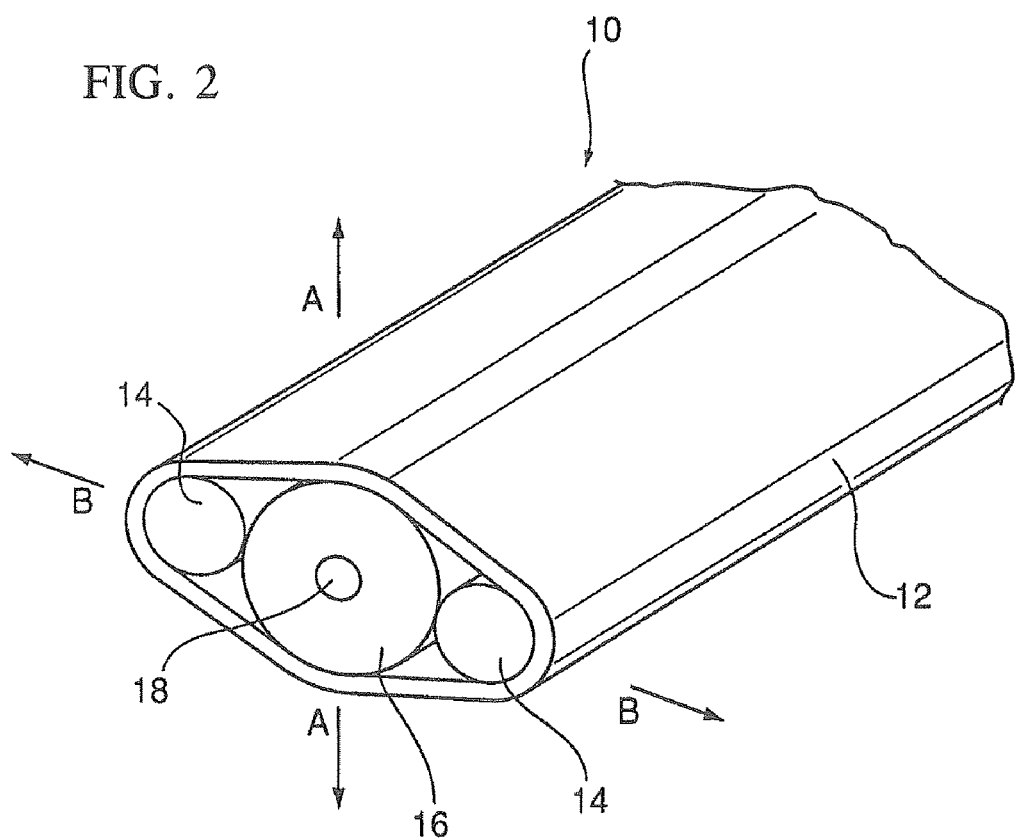
FIG. 2 is a cross-section along line 2-2' of FIG. 1.

FIGS. 1 and 2 illustrate a typical fiber optic drop cable 10. The cable 10 comprises an outer jacket 12, one or more strength members 14 enclosed within the jacket 12, a central buffer tube 16 also enclosed within the jacket, and one or more optical fibers 18 received in the buffer tube 16.

The jacket 12 and the buffer tube 16 are each comprised of a flexible polymeric material. The optical fibers 18 are very small diameter glass rods and are susceptible to damage by over bending. The strength members 14 may be comprised of a flexible, dielectric material having limited flexibility to ensure that the optical fibers 18 are not bent beyond their minimum radius of curvature.

The cable 10 shown in the drawings is a flat drop cable. The jacket 12 has a substantially oval shape with the two strength members 14 being provided alongside, and on opposite sides of, the buffer tube 16 containing the optical fibers 18. This arrangement provides cable 10 with the ability to bend in a controlled manner in the up-and-down direction (indicated by arrows A of FIG. 2), and with limited side-to-side bendability (indicated by arrows B of FIG. 2). Cable 10 is suitable for aerial self-support, direct burial, or for use in conduits. It will be appreciated that the cable 10 shown in the drawings may also include additional components, such as water-blocking strength yarns, toning wires, etc. These additional components are not required for explanation of the present invention, and are therefore not shown. In addition, the optical fibers 18 may be individually provided with a cladding (not shown). Also, for ease of description and illustration, the cable 10 is shown in the drawings as containing only a single optical fiber 18. It will be appreciated that a plurality of optical fibers 18 may be contained in the buffer tube 16.

Although the following description relates to the splicing of a flat drop cable 10 as shown in FIG. 1, it will be appreciated that the present invention may be applied to a large number of drop cable configurations. For example, the present invention can be used to enclose splices in drop cables which have a circular profile and which include either more or fewer strength members than are shown in the cable 10 of FIG. 1.

A first embodiment of the invention is now explained in connection with FIGS. 3 to 9. The enclosure and kit according to the first embodiment are adapted for supporting and protecting a splice in a flat fiber optic drop cable 10 as described above, and comprise a pair of support members 20 extending across the splice, a pair of collars 22 to which the support members 20 are attached, and a cover member 24 covering the spliced fibers 18, the support members 20 and the collars 22.

The collars are shown in the drawings as being cylindrical in shape with a circular cross-section and flat end faces, but this is not essential. The collars may instead have any suitable shape, for example they may have an oval cross-section similar to that of the cable 10. The collars are made of a rigid metal or polymeric material and are provided with a plurality of apertures, described below.

Figure 3:
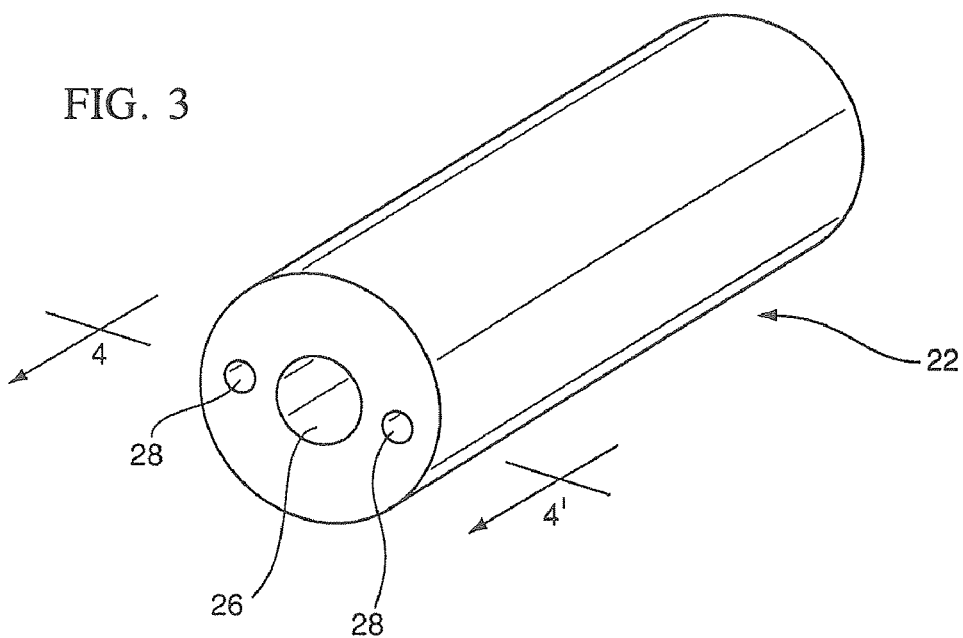
FIG. 3 illustrates a collar for use in the splice enclosure of the invention.
Figure 4:
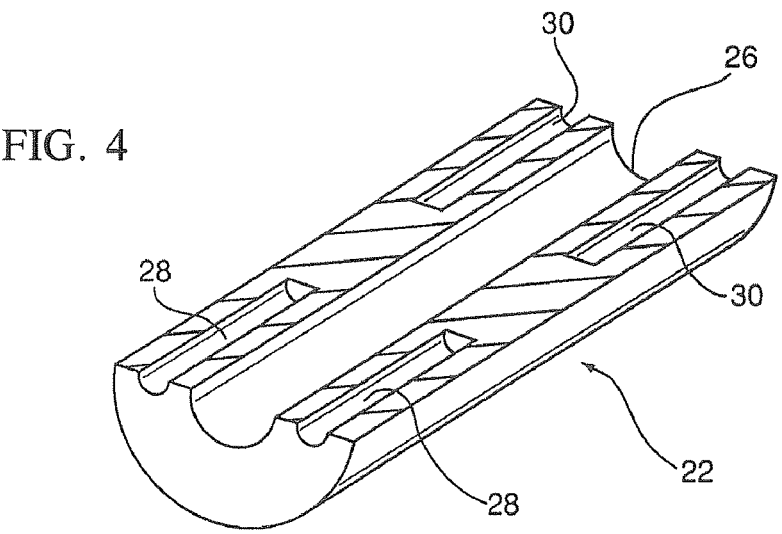
FIG. 4 is a cross-section along line 4-4' of FIG. 3.

A collar 22 is illustrated in FIGS. 3 and 4. Each collar 22 is provided with a central aperture 26 which extends through the entire collar 22 along a longitudinal axis L and is open at both ends. The central aperture 26 is sized and shaped to closely receive the buffer tube 16 of cable 10.

One end of each collar 22 is also provided with a pair of strength member apertures 28. These apertures 28 extend partly through the collar 22 along axis L. The apertures 28 each have one closed end and are sized and shaped to closely receive the ends of the strength members 14 of cable 10. The strength member apertures 28 are located on opposite sides of the central aperture 26 and spaced therefrom, corresponding to the arrangement of buffer tube 16 and strength members 14 in cable 10.

The other end of each collar 22 is provided with a pair of support member apertures 30. These apertures extend partly through the collar 22 along axis L. The apertures 30 are closed at one end and are sized and shaped to closely receive the ends of support members 20 of the splice enclosure. The support member apertures 30 are located on opposite sides of the central aperture 26 and spaced therefrom, corresponding to the arrangement of buffer tube 16 and strength members 14 in cable 10, and preferably also being co-axial with the strength member apertures 28 at the opposite end of the collar 22.

The support members 20 comprise elongate, flexible members which extend across the splice and have opposite ends which are sized and shaped to be closely received in the support member apertures 30 of the collars 22. The support members 20 may be comprised of a flexible, dielectric material having limited flexibility to ensure that the spliced optical fibers 18 are not bent beyond their minimum radius of curvature. It may be preferred that the support members have similar or identical dimensions, composition and flexibility as the strength members 14 of cable 10 so as to substantially preserve the flexibility characteristics of the cable 10 across the splice.

The cover member 24 is preferably an open-ended tube which may have a circular or oval cross-section. The cover member 24 is preferably formed of a flexible polymeric material having flexibility at least as great as that of the support members 20. The cover member 24 may preferably be heat-shrinkable so as to closely cover the splice and minimize the outer diameter of the splice enclosure. In its expanded condition, the inside diameter of the cover member 24 is sufficiently large so that it can easily receive an end of cable 10 and be slid over its outer surface. The cover member 24 also has an inside diameter sufficiently great so that it may be slid over the collars 22. In addition, the cover member 24 is sufficiently long so that it extends across the entire splice and overlaps the jackets 12 of the two cables 10 to be spliced, and the interior surface of the cover member 24 may preferably be provided with an adhesive to adhere it to the cable jackets 12 and collars 22.

In one embodiment of the invention, the cover member 24 is comprised of a transparent polymeric material so as to permit visual inspection of the splice. For this purpose, the cover member 24 may comprise a flexible, heat shrinkable tube comprised of an ionic polymer as described in commonly assigned U.S. Pat. No. 6,454,598 (Burwell et al.) issued on Sep. 24, 2002, which is incorporated herein by reference in its entirety. The ionic polymers described by the Burwell et al. patent are derived from the polymerization of an alpha-olefin and an ethylenically unsaturated carboxylic acid, a proportion of whose acid groups have been reacted to create ionic carboxylates of metal ions. A cover member 24 made from such ionic polymers has high impact toughness, high abrasion and chemical resistance, high resistance to splitting, high degree of transparency, and a relatively low heat shrink temperature.

The enclosure and kit according to the first embodiment may be assembled as follows. It will be appreciated that the order of the steps may vary from that described below.

Each cable 10 is prepared for splicing by removing a section of the jacket 12 to expose a length of buffer tube 16 (with optical fiber 18) and strength members 14. A portion of the buffer tube 16 is removed to bare the optical fiber 18 and the strength members 14 are trimmed. The prepared cable 10 has the trimmed ends of the strength members 14 extending beyond the end of the jacket 12. The buffer tube 16 is trimmed longer and extends beyond the trimmed ends of the strength members 14. The end of the optical fiber 18 is terminated with a cleaved end suitable for splicing and extends beyond the end of the buffer tube 16. The prepared cable may have an appearance as in FIG. 1.

Figure 5:
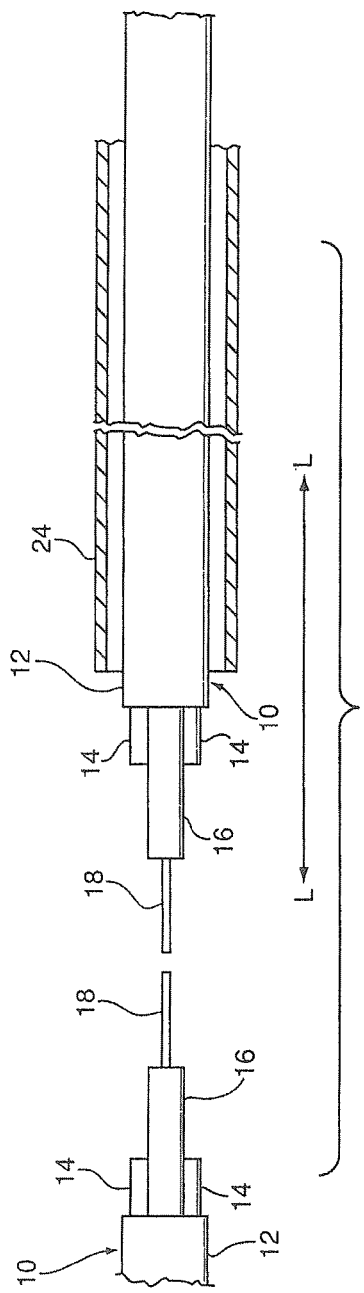
FIGS. 5-9 illustrate the steps involved in forming a splice enclosure according to a first embodiment of the invention.

Once the ends of cables 10 are prepared, the cover member 24 is slid over the end of one of the cables by a sufficient distance so as not to interfere with the splicing of the fibers 18 and the preparation of the splice enclosure. This is shown in FIG. 5.

Figure 6:
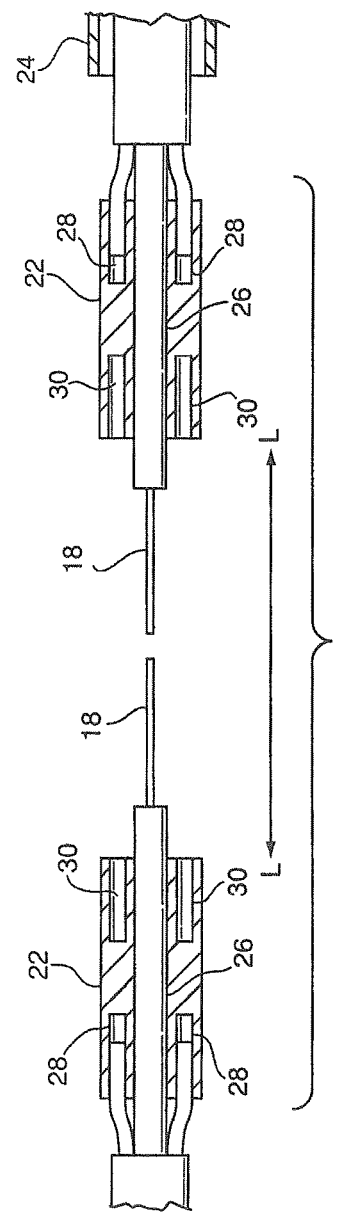

Next, the collars 22 are applied to the ends of the cables 10 as shown in FIG. 6. In particular, the bared optical fiber 18 and the end of the buffer tube 16 are slid through the central aperture 26 of the collar 22. The end of the buffer tube 16 is received in the collar 22 so as to extend out from its end. The ends of the strength members 14 are slid into the strength member apertures 28 of the collar 22 and are secured against removal from apertures 28 by friction or adhesive.

Once the collars 22 are applied to cables 10, the ends of the optical fibers 18 are spliced together in a conventional manner. For example, the ends of fibers 18 may be fused together using an apparatus such as that described in the above-mentioned Ray et al. publication. Persons of ordinary skill in the art would be well acquainted with methods for splicing optical fibers, so further description of the splicing operation is not required. The splice may optionally be provided with a heat shrinkable protective sleeve (not shown), such as that described as element 32 in the above-mentioned Allen et al. publication. It will be appreciated that the lengths of bared optical fibers 18 required to form the splice may be greater than that shown in the drawings.

Figure 7:
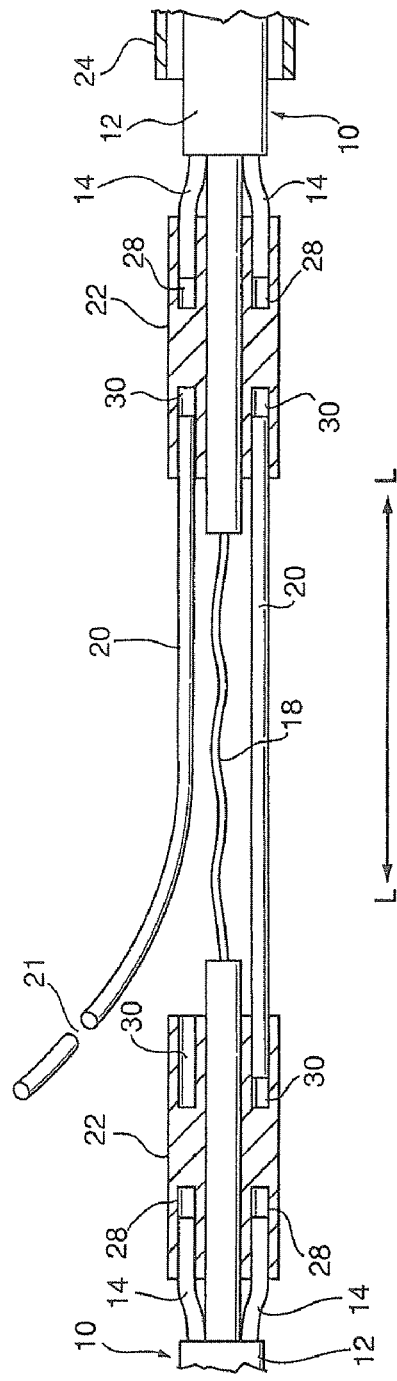

After the optical fibers 18 are spliced and the spliced assembly removed from the splicing apparatus, the support members 20 are trimmed to length and inserted into the support member apertures 30 of the collars 22. This step is illustrated in FIG. 7. The support members 20 are secured against removal from apertures 30 by friction or adhesive. Preferably, both support members 20 are trimmed to the same length as indicated at 21 in FIG. 7, so that when they are inserted into the apertures 30 of collars 22 they have a length which is slightly less than the combined length of the spliced optical fibers 18 between collars 22. This ensures that there will be a certain amount of slack in the spliced optical fibers 18, so as to avoid damaging the spliced fibers 18 when tension is applied across the splice.

Figure 10:
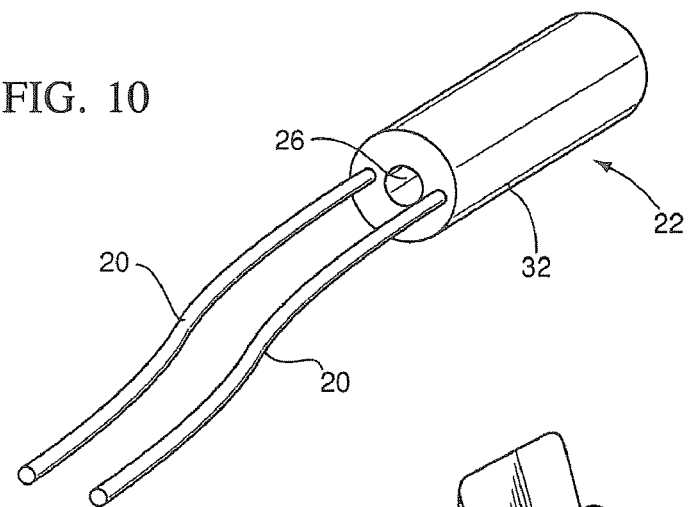
FIG. 10 illustrates a collar assembly according to the invention.

In one variation of the present invention, the support members 20 are pre-assembled with one of the collars 22 to form a collar assembly 32, shown in FIG. 10. As will be appreciated, the use of collar assembly 32 can simplify the formation of the splice enclosure since it eliminates one of the assembly steps and positions the free ends of the support members 20 ready for trimming to length and insertion into the other collar 22. The collar assembly 32 may either be integrally formed or may be pre-assembled from a collar 22 and a pair of support members 20 as described above.

Figure 8:
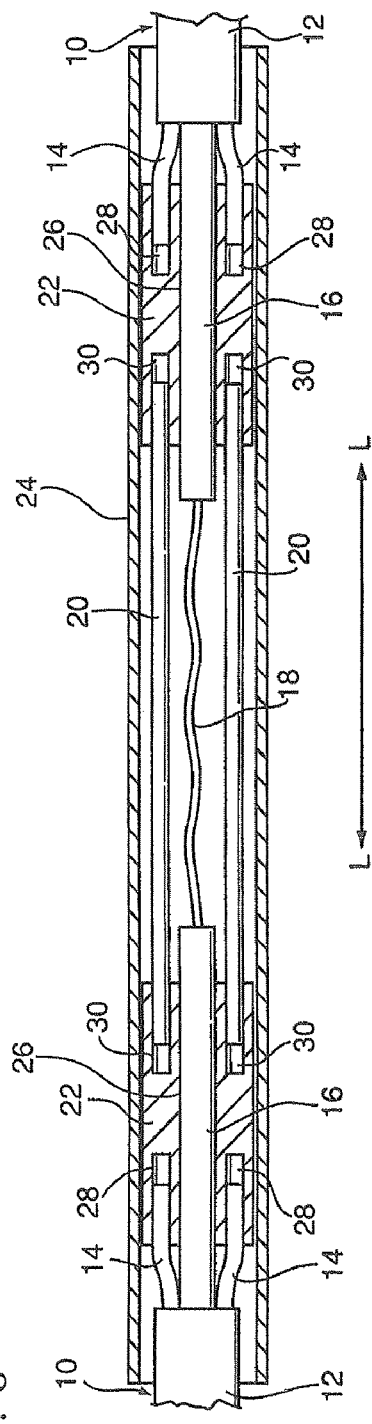
Figure 9:
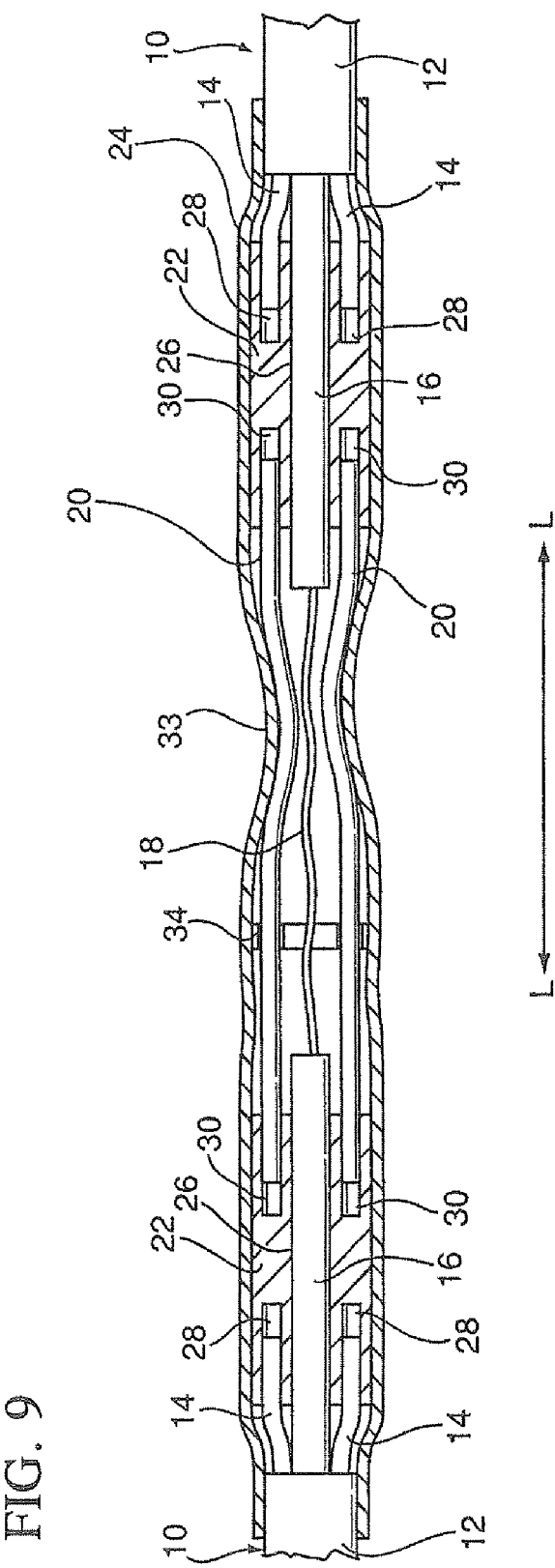

Once the ends of support members 20 are secured in the apertures 30 of collars 22, the cover member 24 is slid over the splice so that its ends overlap the jackets 12 of cables 10 on either side of the splice, as shown in FIG. 8. Once moved into position over the splice, the cover member 24 is heated so as to shrink it into engagement with the cable jackets 12 as shown in FIG. 9. As mentioned above, the inner surface of the cover member 24 may be provided with a layer of adhesive (not shown) so that it will adhere to the cable jackets 12 and provide a water-tight seal to protect the splice. The adhesive may preferably be heat-activated so as to prevent premature adhesion of the cover member 24 to cable 10.

As can be seen from the drawings, the support members 20 of the splice enclosure and the strength members 14 of the cables 10 are in axial alignment with one another, parallel to axis L. In addition, the support members 20 preferably have flexibility which is similar or identical to that of the strength members 14. Therefore, the flexibility properties of the cable assembly across the splice are preferably similar to or the same as the flexibility properties of the individual cables 10. This is particularly advantageous in situations where bending of the cable assembly is required, for example where it is to be pulled through a curved conduit.

Figure 11:
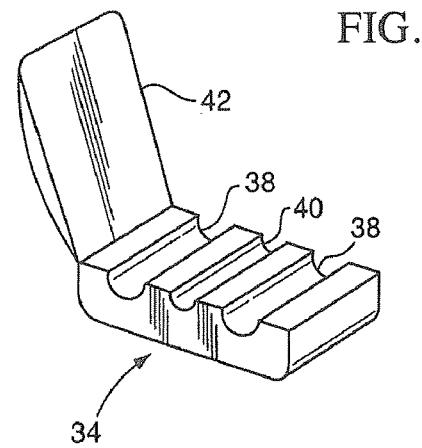
FIGS. 11 and 12 illustrate spacers according to the invention.
Figure 12:
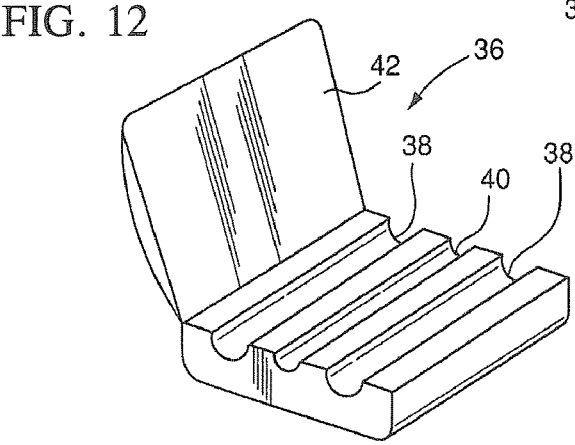

It will be appreciated that precisely controlling the degree of heat shrinking of the cover member 24 may be difficult, particularly under field conditions. Therefore, the portion of the cover member 24 extending between the collars 22 may shrink to a diameter which is less than a width of the cables 10, with the result that a desired separation of the support members 20 may not be achieved throughout the entire splice. This is indicated at 33 in FIG. 9. In order to prevent excessive narrowing of the splice in the region between the collars 22, the splice enclosure and kit according to the present invention may further comprise one or more spacers 34 (FIG. 11) and/or an elongate spacer tray 36 (FIG. 12). The spacer 34 includes a pair of trough-like edge portions 38 in which the support members 20 are received, and a central portion 40 in which the spliced optical fibers 18 are received. The support members 20 may be received in edge portions 38 with a friction fit and/or the spacer 34 may be provided with a cover 42 which may be hinged to the spacer 34 at one edge of the spacer and engage the spacer 34 with a snap fit at an opposite edge. The spacer 34 may preferably be formed from a rigid or semi-rigid polymeric material.

The spacer tray 36 simply comprises an elongated spacer 34, and includes edge portions 38, a central portion 40 and optionally a cover 42 similar to those described above. The spacer tray 36 is preferably comprised of a flexible polymeric material so as not to impair the flexibility of the splice enclosure, and may extend across the entire distance, or part of the distance, between the collars 22.

Figure 13:
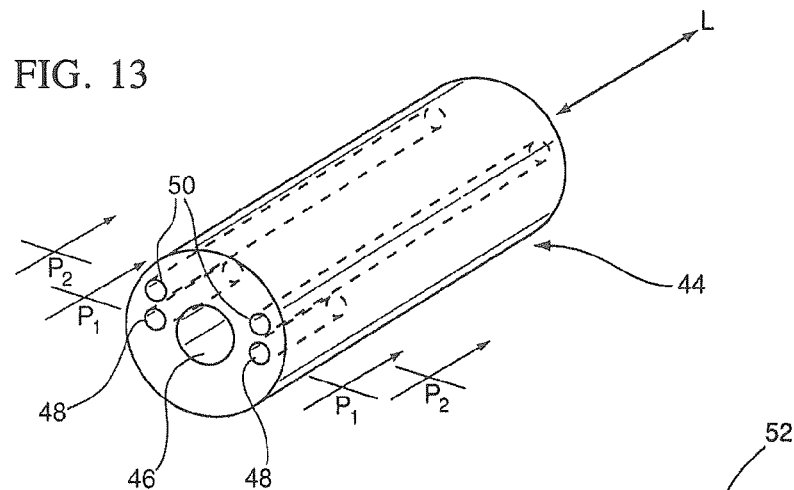
FIGS. 13-15 illustrate alternate collars according to the invention.

A second embodiment of the invention is now discussed below with reference to FIG. 13. As discussed in the context of the first embodiment, the collars 22 of the splice enclosure are provided with a pair of support member apertures 30 which are coaxially aligned with a pair of strength member apertures 28. While this is advantageous in terms of preserving the flexibility of the cable 10 across the splice, it requires relatively precise trimming of the support members 20 to ensure that their length is sufficient to provide a certain amount of slack in the spliced optical fibers 18. The second embodiment of the invention provides at least one collar 44 which allows for easier length adjustment of the ends of the support members 20. The remaining components of the splice enclosure according to the second embodiment of the invention are identical to those of the first embodiment, and are therefore referred to by the same reference numerals. Description of these identical elements is accordingly not required.

Collar 44 is shown as being cylindrical with a circular cross-section and flat end faces, but may have any suitable cross-sectional shape, including oval. Collar 44 is made of a rigid metal or polymeric material and is provided with a plurality of apertures, described below.

Each collar 44 is provided with a central aperture 46 which extends through the entire collar 44 along longitudinal axis L and is open at both ends. The central aperture 46 is sized and shaped to closely receive the buffer tube 16 of cable 10. One end of collar 44 is provided with a pair of strength member apertures 48. These apertures 48 extend partly through the collar 44 along axis L. The apertures 48 each have one closed end and are sized and shaped to closely receive the ends of the strength members 14 of cable 10.

Each collar 44 is also provided with a pair of support member apertures 50. These apertures 50 extend through the entire collar 44 along axis L and are open at both ends. As shown in the drawings, the apertures 50 are parallel to apertures 48 but are offset from the apertures 48 by an amount which will not significantly impair the flexibility characteristics of the cable 10 across the splice. In collar 44, the strength member apertures 48 are both located in a plane P1 which is parallel to a plane P2 in which both of the support member apertures 50 are located.

During preparation of the splice enclosure, the strength members 14 of cable 10 are secured against removal in the strength member apertures 48 of collar 44 and the buffer tube 16 is extended through the central aperture 46. The steps involved in preparing the splice enclosure using collar 44 are the same as for the first embodiment of the invention, with the exception that the support members 20 do not require precise trimming before being inserted into the support member apertures 50 of collar 44. Rather, the ends of support members 20 are inserted through the support member apertures 50 and the distance between collar 44 and the collar at the opposite end of the splice enclosure is then adjusted. Once the distance is adjusted so as to provide a suitable amount of slack in the spliced optical fibers 18, the ends of the support members 20 extending beyond collar 44 are preferably trimmed and the support members 20 are secured against withdrawal in the support member apertures 50.

It will be appreciated that the support members 20 need only be trimmed to length at one end, and therefore an adjustable collar 44 as described above need only be provided at one end of the splice enclosure. The other end of the splice enclosure may be provided with either a collar 22 or a collar assembly 32 as described above in the context of the first embodiment of the invention.

Figure 14:
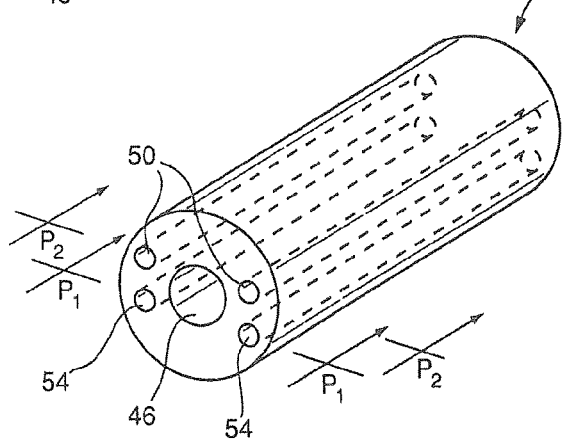

FIG. 14 illustrates a further modified collar 52 which may be used to prepare a splice enclosure according to the present invention. The collar 52 is similar to collar 44 described above, and like elements of collar 52 have been assigned like reference numerals. As shown, collar 52 has a central aperture 46 extending through it from end to end and a pair of support member apertures 50 extending through it from end to end, and being located in a plane P2. Rather than having closed strength member apertures 48, however, the collar 52 is provided with a pair of strength member apertures 54 which are located in plane P1 and extend completely through the collar 52 from end to end. The use of this collar permits the trimming of the strength members 14 to be performed after the collars 52 are slid over the ends of the cables 10. Thus, during preparation of the splice enclosure, and more specifically during the step of sliding the collar 52 over the ends of the cables 10, the end of the buffer tube 16 is inserted through the central aperture 46 until a suitable amount protrudes extends out from the end of the collar. Once the buffer tube 16 is in position, the strength members 14 are secured against withdrawal in the strength member apertures 54 and, if the ends of strength members 14 extend beyond the end of the collar 52, they are trimmed.

Figure 15:
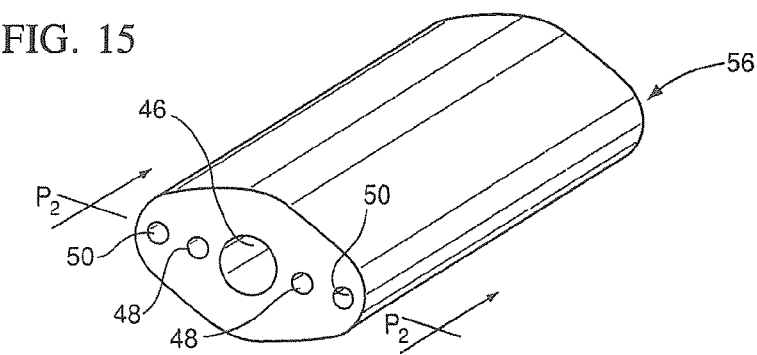

It will be appreciated that the relative locations of strength member apertures and the support member apertures in a collar 44 or 52 can be varied from the locations described above without significantly affecting the flexibility of the cable 10. For example, FIG. 15 illustrates a collar 56 which is similar in construction to collar 52, having a central aperture 46 extending through it from end to end and a pair of strength member apertures 48 extending through it from end to end, and being located in a plane P2. Collar 56 also has a pair of support member apertures 50 extending through it from end to end. The support member apertures 50, however, are located in the same plane as the strength member apertures 48, namely plane P2. Where all the apertures 46, 48, 50 are in the same plane, as in collar 56, the collar 56 may preferably have an oval cross-section, with the major axis of the oval being in plane P2.

Figure 16:
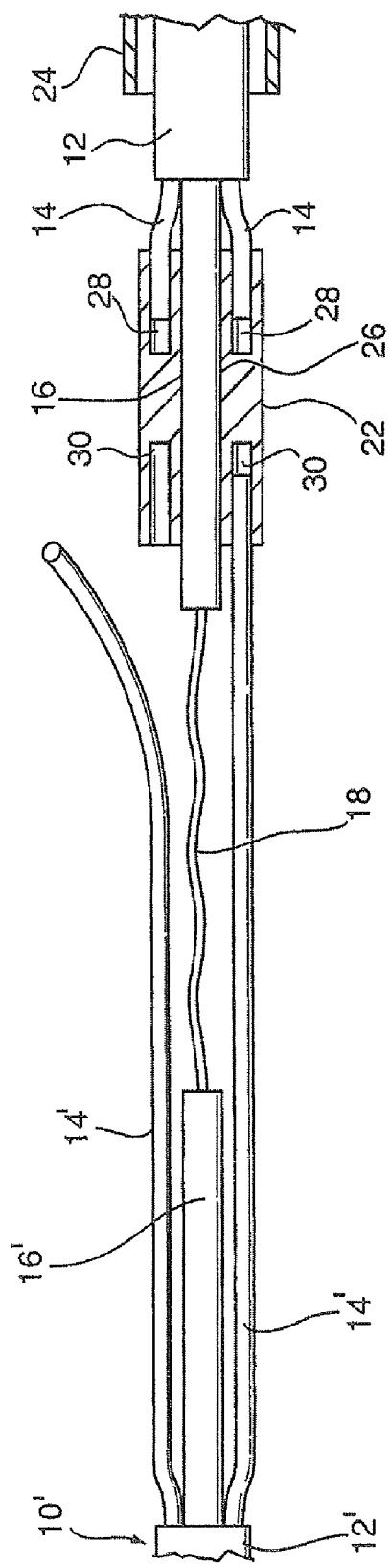
FIG. 16 illustrates the formation of a splice enclosure according to a further embodiment of the invention.

Yet another embodiment of the invention is now described below with reference to FIG. 16. This embodiment of the invention permits the formation of a splice enclosure using fewer components than the embodiments of the invention described above. In particular, the embodiment shown in FIG. 16 may only utilize only a single collar, and eliminates the need for support members to be provided across the splice. In this embodiment excess cable 10 is available so that the end of one of the cables 10 to be joined may be stripped of its jacket 12 for a length which is slightly greater than a length of the splice. For ease of reference, the cable having the longer stripped end, and its components, are identified by primed numbers. The strength members 14' of cable 10' are intentionally left long to serve as support members for the splice.

In order to prepare a splice enclosure according to this embodiment, the end of buffer tube 16' is trimmed to an appropriate length to permit splicing of optical fibers 18, 18'. The end of cable 10 is prepared in the manner described above with reference to the first embodiment of the invention. A collar 22 is then applied to the end of cable 10 such that the buffer tube 16 protrudes through the central aperture 26 and the ends of the strength members 14 of cable 10 are received in the strength member apertures 28. The ends of the strength members 14' of cable 10' are then trimmed, if necessary, and inserted into the support member apertures 30 of collar 22.

The strength members 14, 14' are secured to collar 22 in the manner described above in the first embodiment, and the remaining steps involved in the preparation of the splice enclosure are substantially as described above in the first embodiment, including the application of a cover member 24.

Although the invention has been described with reference to certain preferred embodiments, it is not limited thereto. Rather, the invention includes all embodiments which may fall within the scope of the following claims.

What is claimed is:

1. A splice enclosure supporting a splice between a first fiber optic drop cable and a second fiber optic drop cable, wherein each of the fiber optic cables comprises at least one optical fiber enclosed in a buffer tube, at least one flexible strength member extending alongside the buffer tube, and a jacket enclosing the at least one optical fiber, the buffer tube and the at least one strength member, wherein the at least one optical fiber of the first cable is spliced to the at least one optical fiber of the second drop cable, wherein the enclosure comprises:

(a) at least one longitudinally-extending flexible support member extending across the splice, wherein the at least one support member has flexibility properties similar to those of the at least one strength member;

(b) a cover member which covers the splice and which has a pair of opposed ends which overlap and are sealed to the jackets of the first and second cables, respectively; and (c) a first collar having a length defined along a longitudinal axis and having first and second opposed end faces, wherein the first collar comprises:

(i) a longitudinally-extending central aperture which is sized and shaped to receive the buffer tube, wherein the first aperture is open at both ends and extends from the first end face to the second end face of the first collar;

(ii) at least one longitudinally-extending strength member aperture which is open at the first end face of the first collar, each said strength member aperture being sized and shaped to closely receive an end of one of the strength members of the first cable;

(iii) at least one longitudinally-extending support member aperture which is open at the second end face of the first collar, each said support member aperture being sized and shaped to closely receive an end of one of the support members, and wherein each of the strength member apertures is substantially coaxially aligned with one of the support member apertures of the first collar; and wherein the buffer tube of the first cable extends through the central aperture and extends out from the second end face of the first collar, the ends of the strength members of the first cable are secured against removal in the strength member apertures of the first collar, and the ends of the support members are secured against removal in the support member apertures of the first collar, such that the end of each of the strength members is substantially coaxially aligned with an end of one of the support members.

2. The splice enclosure according to claim 1, further comprising:

(d) a second collar having a length defined along the longitudinal axis and having first and second opposed end faces, wherein the second collar comprises:

(i) a longitudinally-extending central aperture which is sized and shaped to receive the buffer tube of the second cable, wherein the first aperture is open at both ends and extends from the first end face to the second end face of the second collar; and (ii) at least one longitudinally-extending strength member aperture which is open at the first end face of the second collar, each said strength member aperture being sized and shaped to closely receive an end of one of the strength members of the second cable;

wherein the buffer tube of the second cable extends through the central aperture and extends out from the second end face of the second collar, the ends of the strength members of the second cable are secured against removal in the strength member apertures of the second collar, and the support members are secured to the second collar and extend from the second end face of the second collar toward the first collar, and wherein the end of each of the strength members is substantially coaxially aligned with an end of one of the support members.

3. The splice enclosure according to claim 2, wherein the second collar and the support members are components of an integrally formed collar assembly.

4. The splice enclosure according to claim 2, wherein the first and second collars are identical, and wherein the second collar further comprises:
   (iii) at least one longitudinally-extending support member aperture which is open at the second end face of the second collar, each said support member aperture being sized and shaped to closely receive an end of one of the support members, and wherein each of the strength member apertures is substantially coaxially aligned with one of the support member apertures of the second collar; and
   wherein the ends of the strength members of the second cable are secured against removal in the strength member apertures of the second collar.

5. The splice enclosure according to claim 1, wherein the strength member apertures and the support member apertures extend only partially through the first collar, wherein each of the strength member apertures has a closed end spaced inwardly from the first end face of the first collar and each of the support members has a closed end spaced inwardly from the second end face of the first collar, wherein each of the strength member apertures is precisely coaxially aligned with one of the support member apertures of the first collar, and wherein the closed end of each of the strength member apertures is spaced from the closed end of the support member aperture with which it is coaxially aligned.

6. The splice enclosure according to claim 1, wherein the support member apertures extend completely through the first collar, and wherein each of the strength member apertures is parallel to, and spaced from, one of the support member apertures of the first collar.

7. The splice enclosure according to claim 1, wherein the strength member apertures extend completely through the first collar, and wherein each of the strength member apertures is parallel to, and spaced from, one of the support member apertures of the first collar.

8. The splice enclosure according to claim 6, wherein the strength member apertures extend completely through the first collar, and wherein each of the strength member apertures is parallel to, and spaced from, one of the support member apertures of the first collar.

9. The splice enclosure according to claim 6, wherein the strength member apertures are located in a first plane and the support member apertures are located in a second plane, and wherein the first and second planes are parallel.

10. The splice enclosure according to claim 7, wherein the strength member apertures are located in a first plane and the support member apertures are located in a second plane, and wherein the first and second planes are parallel.

11. The splice enclosure according to claim 9, wherein one of the planes passes through a center of the central aperture.

12. The splice enclosure according to claim 6, wherein the strength member apertures and the support member apertures are located in a common plane.

13. The splice enclosure according to claim 7, wherein the strength member apertures and the support member apertures are located in a common plane.

14. The splice enclosure according to claim 12, wherein the common plane passes through a center of the central aperture.

15. The splice enclosure according to claim 1, wherein the collar comprises two of said strength member apertures which are located along opposite sides of the central aperture, and the collar comprises two of said support member apertures.

16. The splice enclosure according to claim 1, wherein the support members comprise end portions of the strength members of the second cable.

17. The splice enclosure according to claim 1, wherein the first collar is substantially cylindrical, and has a circular or oval cross-section.

18. The splice enclosure according to claim 1, wherein the cover member comprises a heat-shrinkable tube.

19. The splice enclosure according to claim 1, further comprising a spacer or spacer tray having portions which receive the support members in order to maintain a spacing between the support members and the spliced optical fibers.

20. A kit for forming a splice enclosure for supporting a splice between a first fiber optic drop cable and a second fiber optic drop cable, wherein each of the fiber optic cables comprises at least one optical fiber enclosed in a buffer tube, at least one flexible strength member extending alongside the buffer tube, and a jacket enclosing the at least one optical fiber, the buffer tube and the at least one strength member, wherein the at least one optical fiber of the first cable is spliced to the at least one optical fiber of the second drop cable, the kit comprising:
   (a) at least one longitudinally-extending flexible support member having a length sufficient to extend across the splice, wherein the at least one support member has flexibility properties similar to those of the at least one strength member;
   (b) a tubular cover member having a diameter sufficient to cover the splice and having a length sufficient to overlap and the ends of the jackets of the first and second cables, respectively, across the splice; and
   (c) a first collar having a length defined along a longitudinal axis and having first and second opposed end faces, wherein the first collar comprises:
      (i) a longitudinally-extending central aperture which is sized and shaped to receive the buffer tube, wherein the first aperture is open at both ends and extends from the first end face to the second end face of the first collar;
      (ii) at least one longitudinally-extending strength member aperture which is open at the first end face of the first collar, each said strength member aperture being sized and shaped to closely receive an end of one of the strength members of the first cable; and
      (iii) at least one longitudinally-extending support member aperture which is open at the second end face of the first collar, each said support member aperture being sized and shaped to closely receive an end of one of the support members, and wherein each of the strength member apertures is substantially coaxially aligned with one of the support member apertures of the first collar.

* * * * *